May 20, 1958 J. V. ROMANO 2,835,745

TELEPHONE SUPPORT

Filed April 7, 1955

INVENTOR.
JAMES V. ROMANO
BY John A. Robertson
ATTORNEY.

United States Patent Office 2,835,745

Patented May 20, 1958

2,835,745

TELEPHONE SUPPORT

James V. Romano, Collingswood, N. J.

Application April 7, 1955, Serial No. 499,881

9 Claims. (Cl. 179—149)

The present invention relates to the art of telephone supports and is concerned primarily with certain novel features in a support for the telephone base.

At the present time, the French type telephone is meeting with widespread, if not substantially universal use. Such a telephone comprises a base and a handpiece. The base includes a pair of plungers which are depressed when the handpiece rests thereon to open the circuit. When the handpiece is lifted, the plungers are permitted to raise and, thus, complete the circuit.

Those engaged in certain types of work often require the use of both hands while talking on the telephone. Because of this need, there have been provided telephone supports which support the handpiece in close proximity to the user's head. Such devices ordinarily include a pedestal for receiving the base of the telephone together with some form of mechanism for controlling the plunger in the base. However, such devices are generally complex or unsatisfactory in other respects.

With the foregoing conditions in mind, the present invention has in view as its foremost objective the provision of a telephone support which consists, essentially, of a pedestal formed with a well for receiving the base of a telephone set and from which pedestal upstands an arm structure having a clamp at its free end for grippingly engaging the handpiece of the telephone set. The pedestal is provided with new and improved mechanism for controlling the plungers in the telephone base.

More in detail, the invention has as an object, the provision, in a telephone support of the character indicated, of a pedestal formed with a well for snugly receiving the base of a telephone set and on each side of which is an upright that is laterally adjustable to bring such uprights in proper position relative to the plungers in the base. The position of these plunger varies with different sets, and it is necessary to accommodate this variation. Rotatably mounted in these uprights, adjacent to the upper ends thereof, is a compound crank having a crosspiece normally engaging the plungers of the telephone base and an operating member of convenient length disposed on the outer side of one of the uprights. This operating member is available to raise or lower the crosspiece to close or open the telephone circuit. A spring detent is operatively associated with the compound crank and mounted on the inner face of one of the uprights to hold the crank in either of the two positions into which it is adapted to be adjusted.

Another object of the invention is to provide, in a telephone support of the type noted, arm structure for supporting the handpiece which consists, essentially, of a bifurcated ear that is swivelly mounted on a vertical axis at one end of the pedestal. Pivotally mounted in this ear at the upper end thereof and on a horizontal axis is an arm which is spring loaded so as to be normally biased into a vertical or upright position. Connected to the upper end of this arm by a universal joint is a second arm and mounted on the free end of this second arm by another universal joint is a clamp for grippingly engaging the handpiece. These universal joints are provided with manually operable set screws to take up wear therein and to insure the generation of the proper amount of frictional resistance in each joint so as the handpiece will remain in a position into which it has been adjusted.

Various other more detailed objects and advantages of the invention, such as arise in connection with carrying out the above-noted ideas in a practical embodiment, will in part become apparent and in part be hereinafter stated as the description of the invention proceeds.

The invention, therefore, comprises a telephone support consisting, essentially, of a pedestal having a well for receiving the telephone base together with laterally adjustable uprights on the opposite sides thereof carrying a compound crank together with a detent for holding the crank in either of two adjusted positions with the crank having a crosspiece which engages the plungers in the telephone base in one adjusted position. Mounted on the pedestal is a swivel ear with the ear carrying a pivotally mounted spring loaded arm. Connected to the upper end of this arm by a universal joint is a second arm which has connected to its free end by a second universal joint a clamp. Both the universal joints have manually adjustable set screws for accommodating wear and achieving a proper amount of frictional resistance therein.

For a full and more complete understanding of the invention, reference may be had to the following description and accompanying drawing wherein:

Figure 3 is taken about on the plane represented by the line 3—3 of Figure 2.

Figures 1, 2, 3, 4:
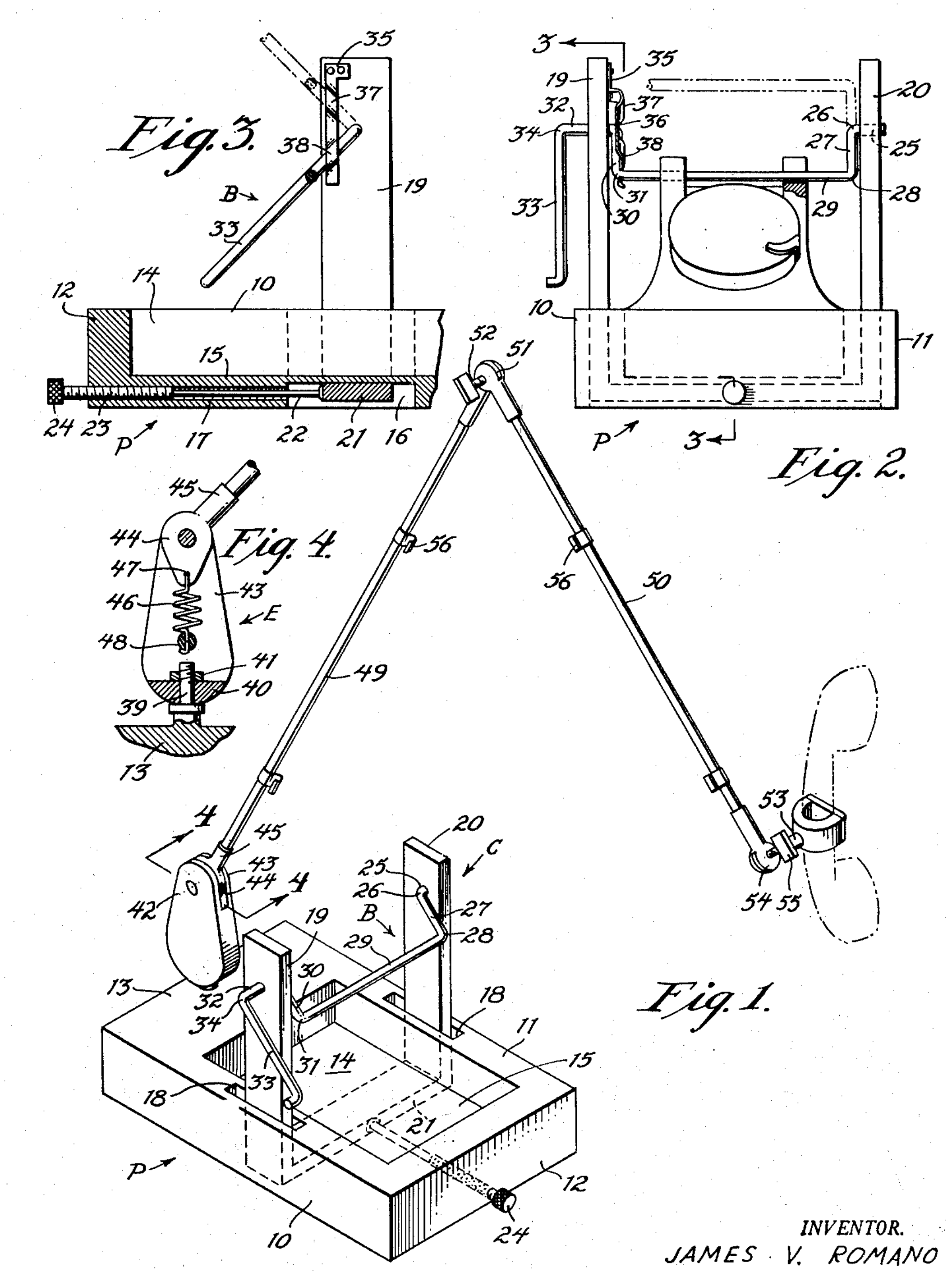
Figure 1 is a perspective view of a telephone support designed in accordance with the precepts of this invention with the base of the telephone omitted and handpiece shown in phantom outline.
Figure 2 is a view in front elevation of the pedestal with the base of a telephone received therein.
Figure 3 is a detailed view taken as a longitudinal vertical section through the pedestal.
Figure 4 is an enlarged detailed vertical section through the swivel ear and is taken about on the plane represented by the line 4—4 of Figure 1.

Referring now to the drawing wherein like reference characters denote corresponding parts and first more particularly to Figure 1, the telephone support of this invention is shown as including a pedestal that is referred to in its entirety by the reference character P. The pedestal P may be of any shape offering the desired ornamental effect but, generally speaking, is of the block-like formation illustrated and presents side walls 10 and 11, a front wall 12, and a thickened rear wall 13. The inner faces of the walls 10, 11, 12, and 13 define a well 14 which is intended to snugly receive the base of a telephone set as will be later described. This well 14 has a bottom wall 15.

Referring now more particularly to Figure 3, it will be noted that the pedestal P is cut away beneath the bottom wall 15 to form a recess 16 and communicating with this recess 16 is a bore 17 which extends to and through the front wall 12. The side walls 10 and 11 are formed with vertically extending passages 18 which communicate at the bottom with the recess 16. A U-shaped carrier is referred to in its entirety by the reference character C. This carrier comprises an upright 19 that is received in the passage 18 of the wall 10, a second upright 20 that is received in the passage 18 of the wall 11 with a bottom member 21 connected to the lower ends of the uprights 19 and 20 and received in the recess 16. A rod 22 is connected to this bottom piece 21 and extends through the bore 17 to a point where it is connected to a screw stem 23. The latter is threadably mounted in the bore 17 and carries at its free end an operating member 24. Obviously, the latter may be rotated to effect a lateral adjustment of the carrier C.

The compound crank is referred to in its entirety by the reference character B. This crank comprises an axial part 25 that is rotatably mounted in the upright 20. Integrally joined to the inner end of the part 25, as by a bend 26, is an arm 27 that is disposed normal to the part 25. Integrally joined to the outer end of the arm 27 by a bend 28 is a crosspiece 29. This crosspiece extends over the well 14 and at its other end is integrally joined to an arm 30 by a bend 31. The upper end of the arm 30 is integrally joined to a second axial part 32 that is rotatably mounted in the upright 19 on an axis in alignment with the axial part 25. An operating member 33 is integrally joined to the outer end of the axial part 32 by a bend 34 and extends downwardly and forwardly an appreciable distance sufficient for convenient operation.

A detent takes the form of a leaf spring having an end portion at 35 that is secured to the inner face by the upright 19 at the upper end thereof in any preferred manner. This spring has a main body portion 36 that is offset from or in spaced relation with respect to the inner face of the upright 19. This main body portion is formed with two grooves 37 and 38 into either of which the arm 30 is adapted to snap. When the arm 30 is so received, the crank B is yieldably held against rotative movement.

Carried by the upper face of the thickened rear wall 13 is a stub shaft 39 (see Figure 4). A swivel ear E has a bottom wall 40 that is rotatably mounted on the stub shaft 39 and held in position thereon by a nut 41. The swivel ear E is of a bifurcated construction presenting side walls 42 and 43. Pivotally mounted between these walls 42 and 43, adjacent to the upper ends thereof, is a cam-like member 44 that carries a socket member 45. A tension coil spring 46 has one end anchored to the member 44, as indicated at 47, while its other end is anchored to the ear E, as indicated at 48. This spring 46 spring loads the cam-like member 44 causing it to normally assume the position illustrated in Figures 1 and 4.

An arm 49 has one end received in the socket member 45 while its other end is connected to a second arm 50 by a universal joint 51. Universal joints of this type are well-known, and a detailed description thereof is believed to be unnecessary for the purposes of this specification. However, it is notable that the universal joint 51 includes a manually adjustable set screw 52 which may be operated to take up wear in the joint 51 and insure that the latter has a proper amount of frictional resistance to movement.

A clamp 53 is connected to the outer or free end of the arm 50 by a second universal joint 54 and which universal joint 54 also includes manually operable set screw 55.

Both of the arms 49 and 50 are provided with clips 56 which are adapted to receive the cable that is connected to the handpiece.

*Operation*

While the mode of operation and manner of using the above described telephone support is believed to be obvious from the illustration of the drawing and description of the parts given, it may be briefly outlined as follows:

The base of the telephone set is positioned in the well 14. Such bases are generally of standard construction, and the well 14 is dimensioned to snugly receive the base. After being so positioned, the operating member 24 on the screw stem 23 may be availed of to adjust the carrier C so as to bring the crosspiece 29 of the compound crank in proper position relative to the plungers in the base. This is illustrated in Figure 2. Thus, with the operating member 33 depressed so that the arm 30 of the crank is received in the groove 38, the crosspiece 29 engages the plungers to keep the telephone circuit open.

The handpiece of the telephone is grippingly engaged by the clamp 53 and the cable to the handpiece is engaged by the clips 56 so as to run up along the arms 49 and 50. These arms may now be adjusted to bring the handpiece into proper position relative to the head of the user. Such adjustment is provided by the two universal joints 51 and 54, the pivotal mounting of the member 44, and the swivel ear E.

When the telephone is to be used, the user simply flips the operating member 33 upwardly into the position in which the arm 30 is received in the groove 37. The telephone circuit is now closed and the operator may use the phone with both his hands free. When the conversation is completed, the phone is shut off by flipping the operating member 33 downwardly into the position in which the arm 30 is received in the groove 38.

While a preferred specific embodiment of the invention is hereinbefore set forth, it is to be clearly understood that the invention is not to be limited to the exact construction, mechanisms, and devices illustrated and described, because various modifications of these details may be provided in putting the invention into practice within the purview of the appended claims.

What is claimed is:

1. In a telephone support, a pedestal formed with a well adapted to snugly receive the base of a telephone set, and arm structure upstanding from said pedestal having a clamp at its free end for grippingly engaging the handpiece of said telephone set; and upright carried by said pedestal at one side of said well, and a compound crank pivotally mounted in said upright and operable to depress or permit the raising of the circuit controlling plungers in said base.

2. In a telephone support, a pedestal formed with a well adapted to snugly receive the base of a telephone set, and arm structure upstanding from said pedestal having a clamp at its free end for grippingly engaging the handpiece of said telephone set; a pair of uprights carried by said pedestal on opposite sides of said well, and a compound crank pivotally mounted in said uprights, said crank including a crosspiece adapted to engage the circuit controlling plungers in said base, and an operating arm.

3. In a telephone support, a pedestal formed with a well adapted to snugly receive the base of a telephone set, and arm structure upstanding from said pedestal having a clamp at its free end for grippingly engaging the handpiece of said telephone set; an upright carried by said pedestal at one side of said well, means for laterally adjusting said upright, and a compound crank pivotally mounted in said upright and operable to depress or permit the raising of the circuit controlling plungers in said base.

4. In a telephone support, a pedestal formed with a well adapted to snugly receive the base of a telephone set, and arm structure upstanding from said pedestal having a clamp at its free end for grippingly engaging the handpiece of said telephone set; a pair of uprights carried by said pedestal on opposite sides of said well, means for laterally adjusting said pair of uprights as a unit, and a compound crank pivotally mounted in said uprights, said crank including a crosspiece adapted to engage the circuit controlling plungers in said base, and an operating arm.

5. In a telephone support, a pedestal formed with a well adapted to snugly receive the base of a telephone set, and arm structure upstanding from said pedestal having a clamp at its free end for grippingly engaging the handpiece of said telephone set; an upright carried by said pedestal at one side of said well, a compound crank pivotally mounted in said upright and operable to depress or permit the raising of the circuit controlling plungers in said base, and a spring detent for yieldably holding said crank in either of two adjusted positions.

6. In a telephone support, a pedestal formed with a well adapted to snugly receive the base of a telephone set, and arm structure upstanding from said pedestal having a clamp at its free end for grippingly engaging the handpiece of said telephone set; a pair of uprights carried by said pedestal on opposite sides of said well, and a compound crank pivotally mounted in said uprights, said crank including a crosspiece adapted to engage the circuit controlling plungers in said base, an operating arm, and a spring detent carried by one of said uprights and operatively associated with said crank to hold the latter in either of two adjusted positions.

7. In a telephone support, a pedestal formed with a well adapted to snugly receive the base of a telephone set, and arm structure upstanding from said pedestal having a clamp at its free end for grippingly engaging the handpiece of said telephone set; an upright carried by said pedestal at one side of said well, means for laterally adjusting said upright, a compound crank pivotally mounted in said upright and operable to depress or permit the raising of the circuit controlling plungers in said base, and a spring detent for yieldably holding said crank in either of two adjusted positions.

8. In a telephone support, a pedestal formed with a well adapted to snugly receive the base of a telephone set, and arm structure upstanding from said pedestal having a clamp at its free end for grippingly engaging the handpiece of said telephone set; a pair of uprights carried by said pedestal on opposite sides of said well, means for laterally adjusting said pair of uprights as a unit, and a compound crank pivotally mounted in said uprights, said crank including a crosspiece adapted to engage the circuit controlling plungers in said base, an operating arm, and a spring detent carried by one of said uprights and operatively associated with said crank to hold the latter in either of two adjusted positions.

9. In a telephone support, a pedestal formed with a well adapted to receive the base of a telephone set, a swivel ear pivotally mounted on a vertical axis on said pedestal, an arm pivotally mounted on said ear on a horizontal axis, a spring carried by said ear for biasing said arm into a normal position, a second arm connected to said first mentioned arm by a universal joint, a clamp joined to the free end of said second arm by a second universal joint and adapted to grippingly engage the handpiece of said telephone set, and a manually adjustable set screw included in each of said universal joints for taking up wear therein and creating a required degree of frictional resistance to relative movement of the parts joined by the universal joint.

References Cited in the file of this patent

UNITED STATES PATENTS

| | | |
|---|---|---|
| 2,310,032 | Mathieson | Feb. 2, 1943 |
| 2,435,816 | Anderson | Feb. 10, 1948 |
| 2,663,764 | Holmes | Dec. 22, 1953 |
| 2,712,039 | Holmes | June 28, 1955 |